Patented July 28, 1936

2,049,212

UNITED STATES PATENT OFFICE 2,049,212

ANTHRAQUINONE DERIVATIVE

Ralph N. Lulek, Wilmington, Del., assignor to E. I. du Pont de Nemours & Company, Wilmington, Del., a corporation of Delaware No Drawing. Application February 27, 1930, Serial No. 431,977

29 Claims. (Cl. 260—44)

This invention relates to dyestuff intermediates and more particularly to derivatives of the anthraquinone series and their process of production. It especially contemplates such compounds containing nitrogen and selenium.

It is an object of this invention to produce a new series of organic chemical compounds. Other objects are to produce new dyestuff intermediates of the anthraquinone series, to develop new processes for their production, and, in general, to improve the prior art. Other objects will appear hereinafter.

These objects are accomplished by the present invention whereby anthraselenazole-carboxylic acids and anthraselenazole-carboxylic acid chlorides are produced. Representative compounds of these groups have structural formulae as follows:

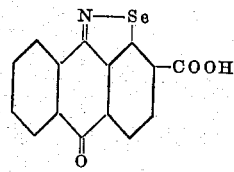
—COOH

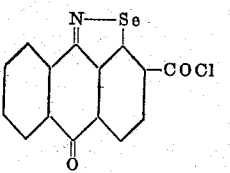
—COCl

The carboxylic acid compounds are produced by treating a 1-halo-anthraquinone-carboxylic acid for example 1-chloro-anthraquinone-2-carboxylic acid with potassium selenide and ammonia. The reaction taking place is probably indicated by the following equations:

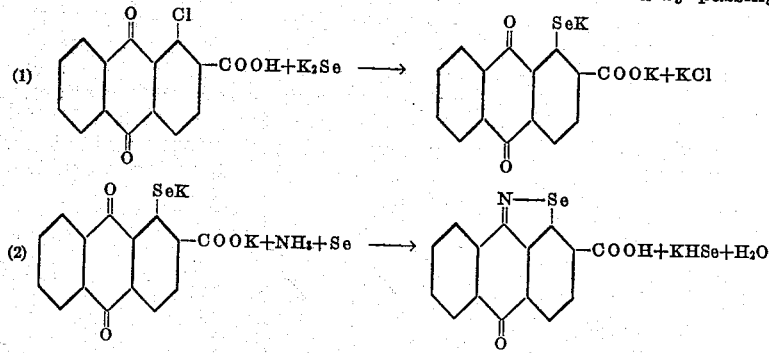

The carboxylic acids are converted to the corresponding carbonyl chlorides by treatment with such agents as thionyl chloride, phosphorous pentachloride and the like, as indicated in the following equation:

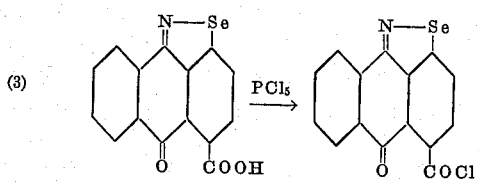

The invention will be readily understood from a consideration of the following examples. The proportions given are by weight.

Example I

One hundred twenty parts (120) of 1-chloro-anthraquinone-2-carboxylic acid are heated and stirred with potassium selenide solution (obtained by passing 67 parts of hydrogen selenide into 600 parts of a 17% potassium hydroxide solution) and 800 parts of 26–28% aqueous ammonia to 120–140° C., in an autoclave for ten hours. The mass is then removed from the autoclave, filtered, and washed with salt solution. The cake is then dissolved in weak caustic alkali, filtered, and the free 1:9-anthraselenazo-2-carboxylic acid precipitated with hydrochloric acid.

Example II

One hundred twenty (120) parts of 1-chloro-anthraquinone-4-carboxylic acid are heated and stirred with potassium selenide solution (obtained by passing 67 parts of hydrogen selenide into 600 parts of a 17% potassium hydroxide solution) and 800 parts of 26–28% aqueous ammonia to 120–140° C. in an autoclave for ten hours. The mass is then removed from the autoclave, filtered, and washed with salt solution. The cake is then dissolved in weak caustic alkali, filtered, and the free 1:9-anthraselenazole-4-carboxylic acid precipitated with hydrochloric acid.

*Example III*

One hundred twenty parts (120) of 1-chloro-anthraquinone-2-carboxylic acid are heated and stirred with sodium selenide solution (obtained by passing 67 parts of hydrogen selenide into 550 parts of a 15% sodium hydroxide solution) and 800 parts of 26–28% aqueous ammonia to 120–140° C. in an autoclave for ten hours. The mass is then removed from the autoclave, filtered and washed with salt solution. The cake is then dissolved in weak caustic alkali, filtered, and the free 1:9-anthraselenazole-2-carboxylic acid precipitated with hydrochloric acid.

The new intermediates are yellow powders, soluble in hot water, easily soluble in alkali, concentrated sulphuric acid with yellow color, and slightly soluble in pyridine. They give cherry-red vats with an alkali metal hydrosulphite.

The 1:9 anthraselenazole-carboxylic acids (also called 1:9-isoselenazole-anthrone-carboxylic acids) obtained according to the above disclosure may be converted to 1:9-anthraselenazole-carboxylic acid-chlorides by the action of thionyl chloride or phosphorous pentachloride as indicated by the following example:

*Example IV*

Ten (10) parts of 1:9-anthraselenazole-2-carboxylic acid are suspended in 50 parts of nitrobenzene and 10 parts phosphorous pentachloride added. The mixture is heated to 100° C. and that temperature maintained for one hour. It is then cooled to room temperature and the crystalline compound is filtered off, washed with nitrobenzene and alcohol and dried.

The invention is not limited to 1-chloro-anthraquinone-2-carboxylic acid as the starting reagent since other halogens or groups capable of conversion to the seleno-phenol form by alkali selenide may be employed. It is possible to carry out the process of the invention using as a starting reagent 1-seleno-phenol-anthraquinone-carboxylic acids.

The best results have been obtained with the chlorine substituted compound. It is not necessary that the carboxylic acid group be in the "2" position to successfully carry out the reaction as indicated in the above examples. While the 1-chloro-anthraquinone-2-carboxylic acid is preferred, 1-chloro-anthraquinone-4-carboxylic acid also gives excellent results. The use of potassium selenide is not limiting since other alkali metal selenides may be successfuly used, for example, sodium selenide, as indicated in the above examples. Compounds containing the aldehyde group (CHO) instead of the carboxyl group (COOH) fall within the scope of this invention.

The new compounds are valuable intermediates for anthraquinone dyes.

As many apparently widely different embodiments of this invention may be made without departing from the spirit and scope thereof, it is to be understood that I do not limit myself to the specific embodiments thereof except as defined in the appended claims.

I claim:
1. The compound having the following formula:

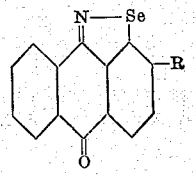

where R is a member of the group,

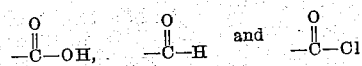

2. The product which is substantially identical with that obtainable by heating about 120 parts by weight of 1-chloro-anthraquinone-2-carboxylic acid with about 800 parts by weight of about 26–28% aqueous ammonia and the product of passing about 67 parts by weight of hydrogen selinide into about 600 parts by weight of about 17% potassium hydroxide solution to about 120° C.–140° C. in an autoclave for about 10 hours, separating the resultant solid, dissolving said resultant solid in caustic alkali, adding sufficient hydrochloric acid to the resultant to cause precipitation, separating said precipitate, which probably has the following formula:

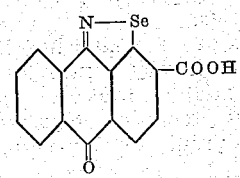

which is a yellow powder which is soluble in hot water, which is easily soluble in alkali, which is soluble in concentrated sulphuric acid with a yellow color, which is slightly soluble in pyridine and which gives cherry-red vats with alkali metal hydrosulphites.

3. The product which is substantially identical with that obtainable by heating about 120 parts by weight of 1-chloro-anthraquinone-2-carboxylic acid with about 800 parts by weight of about 26–28% aqueous ammonia and the product of passing about 67 parts by weight of hydrogen selenide into about 600 parts by weight of about 17% potassium hydroxide solution to about 120° C.–140° C. in an autoclave for about 10 hours, separating the resultant solid, dissolving said resultant solid in caustic alkali, adding sufficient hydrochloric acid to the resultant to cause precipitation, separating said precipitate, suspending the same in nitrobenzene, the precipitate and nitrobenzene being in about the proportions 1 to 5 parts by weight respectively, and adding an amount of phosphorous pentachloride about equal in weight to the said separated precipitate, heating the resultant mixture to about 100° C. for about one hour, cooling, filtering, washing the residue with nitrobenzene, and which probably has the following formula:

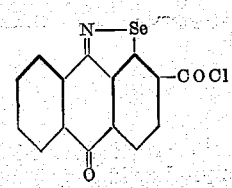

4. The preparation of dyestuffs intermediates of the anthraquinone series which comprises heating in an autoclave and in the presence of ammonia and alkali metal selenide, compounds of the formula:

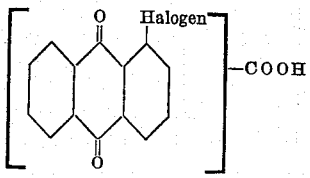

5. The process of producing an intermediate of the anthraquinone series, which comprises heating at a temperature of 120° C.–140° C. in an autoclave with alkali metal selenide and ammonia, an anthraquinone-carboxylic acid containing, in the 1-position, a radical which is replaceable by a selenophenol radical by the action of an alkali metal selenide.

6. The process of producing an intermediate of the anthraquinone series, which comprises heating at a temperature of 120° C.–140° C. in an autoclave, with an alkali metal selenide and ammonia, an anthraquinone containing halogen in the 1-position, and containing in the 2-position a carboxyl group.

7. The process comprising treating a 1-halogen-anthraquinone-carboxylic acid with alkali metal selenide and aqueous ammonia under heat in an autoclave, filtering off the resultant alkali metal salt of 1:9-anthraselenazole-carboxylic acid, dissolving this compound in caustic alkali and precipitating 1:9-anthraselenazole-carboxylic acid with hydrochloric acid.

8. The process which comprises heating about 120 parts by weight of 1-chloro-anthraquinone-2-carboxylic acid with about 100 parts by weight of about 26–28% aqueous ammonia and the product of passing about 67 parts by weight of hydrogen selenide into about 600 parts by weight of about 17% alkali metal selenide to about 120–140° C. for 10 hours in a closed vessel and separating the resulting solid.

9. The process which comprises heating about 120 parts by weight of 1-chloro-anthraquinone-2-carboxylic acid with about 800 parts by weight of about 26–28% aqueous ammonia and the product of passing about 67 parts by weight of hydrogen selenide into about 600 parts by weight of about 17% alkali metal selenide, to about 120–140° C. for about ten hours said reaction being carried out at pressures in excess of atmospheric, separating the resultant solid, dissolving in caustic alkali and precipitating with acid.

10. The compound having the following formula:

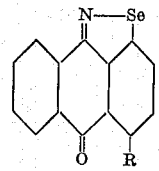

where R is a member of the group,

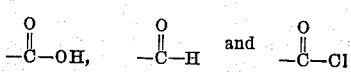

11. The compound having the following formula:

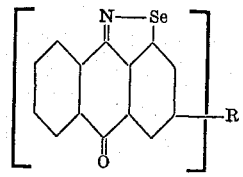

where R is a member of the group,

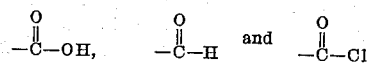

12. The product which is substantially identical with that obtainable by heating about 120 parts by weight of 1-chloro-anthraquinone-4-carboxylic acid with about 800 parts by weight of about 26–28% aqueous ammonia and the product of passing about 67 parts by weight of hydrogen selenide into about 600 parts by weight of about 17% potassium hydroxide solution to about 120° C.–140° C. in an autoclave for about 10 hours, separating the resultant solid, dissolving said resultant solid in caustic alkali, adding sufficient hydrochloric acid to the resultant to cause precipitation, separating said precipitate, which probably has the following formula:

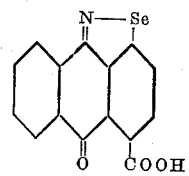

which is a yellow powder which is soluble in hot water, which is easily soluble in alkali, which is soluble in concentrated sulphuric acid with a yellow color, which is slightly soluble in pyridine and which gives cherry-red vats with alkali metal hydrosulphites.

13. The product which is substantially identical with that obtainable by heating about 120 parts by weight of a 1-chloro-anthraquinone-carboxylic acid with about 800 parts by weight of about 26–28% aqueous ammonia and the product of passing about 67 parts by weight of hydrogen selenide into about 600 parts by weight of about 17% potassium hydroxide solution to about 120° C.–140° C. in an autoclave for about 10 hours, separating the resultant solid, dissolving said resultant solid in caustic alkali, adding sufficient hydrochloric acid to the resultant to cause precipitation, separating said precipitate, which probably has the following formula:

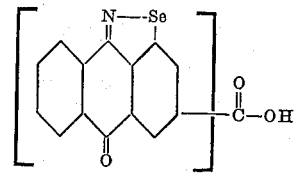

which is a yellow powder which is soluble in hot water, which is easily soluble in alkali, which is soluble in concentrated sulphuric acid with a yellow color, which is slightly soluble in pyridine and which gives cherry-red vats with alkali metal hydrosulphites.

14. The process of producing an intermediate of the anthraquinone series, which comprises heating at a temperature of 120° C.–140° C. in an autoclave, with an alkali metal selenide and ammonia, an anthraquinone containing chlorine in the 1-position, and containing in the 2-position a carboxyl group.

15. The process of producing an intermediate of the anthraquinone series, which comprises heating at a temperature of 120° C.–140° C. in an autoclave, with an alkali metal selenide and ammonia, an anthraquinone containing chlorine in the 1-position, and containing in the 4-position a carboxyl group.

16. The process of producing an intermediate of the anthraquinone series, which comprises heating at a temperature of 120° C.–140° C. in an autoclave with alkali metal selenide and ammonia, an anthraquinone-carboxylic acid containing, in the 1-position, a halogen.

17. The process of producing an intermediate of the anthraquinone series, which comprises heating at a temperature of 120° C.–140° C. in an autoclave with alkali metal selenide and ammonia, an anthraquinone-carboxylic acid containing, in the 1-position, chlorine.

18. The process of producing an intermediate of the anthraquinone series, which comprises heating at a temperature of 120° C.–140° C. in an autoclave, with an alkali metal selenide and ammonia, an anthraquinone containing halogen in the 1-position, and containing in the 4-position a carboxyl group.

19. The process of producing a 1:9-anthraselenazole-carboxylic acid which comprises raising the temperature of a 1-halogen-anthraquinone mixed with an alkali metal selenide and aqueous ammonia to a temperature greater than 120° C. in a vessel adapted to maintain the contents under the pressure generated by the aforesaid temperature elevation, and filtering off the resultant alkali metal salt of the 1:9-anthraselenazole-carboxylic acid.

20. The product which is substantially identical with that obtainable by heating about 120 parts by weight of 1-chloro-anthraquinone-carboxylic acid with about 800 parts by weight of about 26–28% aqueous ammonia and the product of passing about 67 parts by weight of hydrogen selenide into about 600 parts by weight of about 17% potassium hydroxide solution to about 120° C.–140° C. in an autoclave for about 10 hours, separating the resultant solid, dissolving said resultant solid in caustic alkali, adding sufficient hydrochloric acid to the resultant to cause precipitation, separating said precipitate, suspending the same in nitro-benzene, the precipitate and nitrobenzene being in about the proportions 1 to 5 parts by weight respectively, and adding an amount of phosphorous pentachloride about equal in weight to the said separated precipitate, heating the resultant mixture to about 100° C. for about one hour, cooling, filtering, washing the residue with nitrobenzene, and which probably has the following formula:

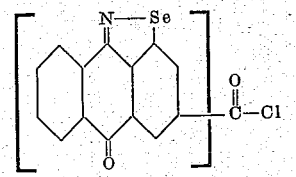

21. The process of producing an intermediate of the anthraquinone series, which comprises heating at a temperature of 120° C.–140° C. in an autoclave with alkali metal selenide and ammonia, an anthraquinone-carboxylic acid containing a halogen in the 1-position.

22. The process of producing an intermediate of the anthraquinone series, which comprises heating at a temperature of 120° C.–140° C. in an autoclave, with an alkali metal selenide and ammonia, an anthraquinone-2-carboxylic acid containing a halogen in the 1-position.

23. The process of producing an intermediate of the anthraquinone series, which comprises heating at a temperature of 120° C.–140° C. in an autoclave, with an alkali metal selenide and ammonia, an anthraquinone-4-carboxylic acid containing a halogen in the 1-position.

24. A 1:9-anthraselenazole having a substituent from the group consisting of —COOH, —CHO and —CO— halogen.

25. A 1:9-anthraselenazole having a carbonyl halide substitutent in the 2 position.

26. A 1:9-anthraselenazole having a substituent from the group consisting of —COOH, —CHO$_2$ and —CO— halogen in the 4 position.

27. A 1:9-anthraselenazole having a substituent from the group consisting of —COOH, —CHO$_2$ and —CO— halogen in the 2 position.

28. A 1:9-anthraselenazole having a carbonyl halide substituent.

29. The process of producing a 1:9-anthraselenazole-carboxylic acid which comprises treating a 1-halogen anthraquinone carboxylic acid with an alkali metal selenide and aqueous ammonia at a temperature greater than 120° C. and at a pressure greater than atmospheric and filtering off the resultant alkali metal salt of the 1:9-anthraselenazole-carboxylic acid.

RALPH N. LULEK.